Dec. 19, 1944. W. H. HAIGLER, SR., ET AL 2,365,465
WEED DESTROYER
Filed Feb. 12, 1942 3 Sheets-Sheet 1

Inventors
William Hope Haigler, Sr.
Lawrence B. Haigler.
John Alford Haigler.

By Clarence A. O'Brien
and Harvey B. Jacobson
Attorneys

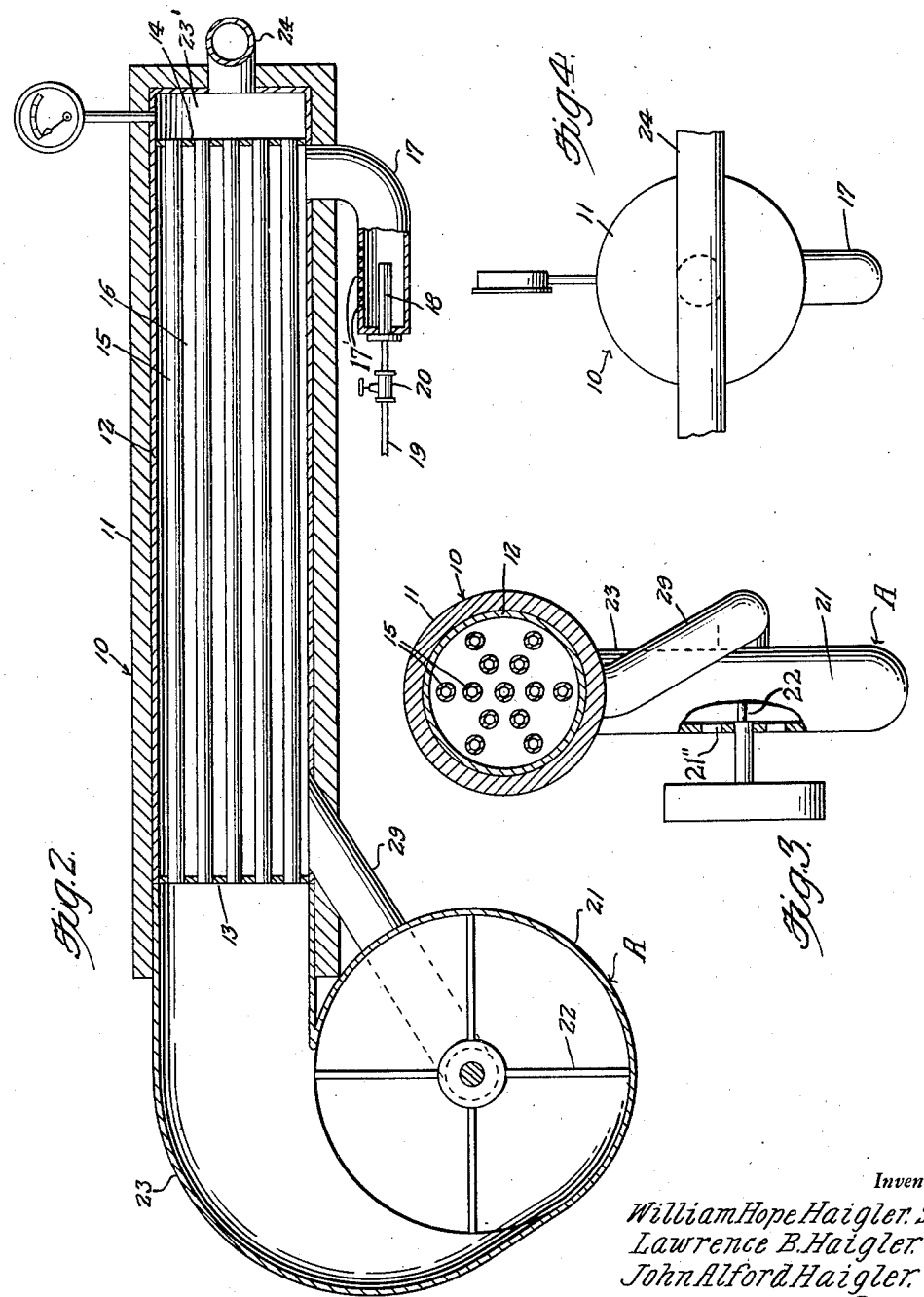

Dec. 19, 1944. W. H. HAIGLER, SR., ET AL 2,365,465
WEED DESTROYER
Filed Feb. 12, 1942 3 Sheets-Sheet 3

Inventors
William Hope Haigler, Sr.
Lawrence B. Haigler.
John Alford Haigler.

By Clarence A. O'Brien
and Harvey B. Jackson
Attorneys

Patented Dec. 19, 1944

2,365,465

UNITED STATES PATENT OFFICE 2,365,465

WEED DESTROYER

William Hope Haigler, Sr., Lawrence Brake Haigler, and John Alford Haigler, Montgomery, Ala.

Application February 12, 1942, Serial No. 430,682

1 Claim. (Cl. 126—271.2)

This invention relates to new and useful improvements in apparatus for destroying weeds and growths of various kinds having a tendency to choke or retard the growth of growing crops.

The principal object of the present invention is to provide a weed destroyer which can be conveniently operated from a conventional agricultural machine and which in operation employs hot air and gases in place of a flame or chemicals which may be harmful to the growing crop.

Another important object of the invention is to provide a weed destroyer of the character stated which is of simple construction and which can be bought, installed and operated at a low cost.

Other objects and advantages of the invention will become apparent to the reader of the following description.

In the drawings—

Figure 2 is an enlarged longitudinal sectional view taken substantially on the line 2—2 of Figure 1.

Figure 3 is an enlarged fragmentary detailed sectional view taken substantially on the line 3—3 of Figure 1.

Figure 4 is a fragmentary end elevational view looking at the heating apparatus.

Figure 1:
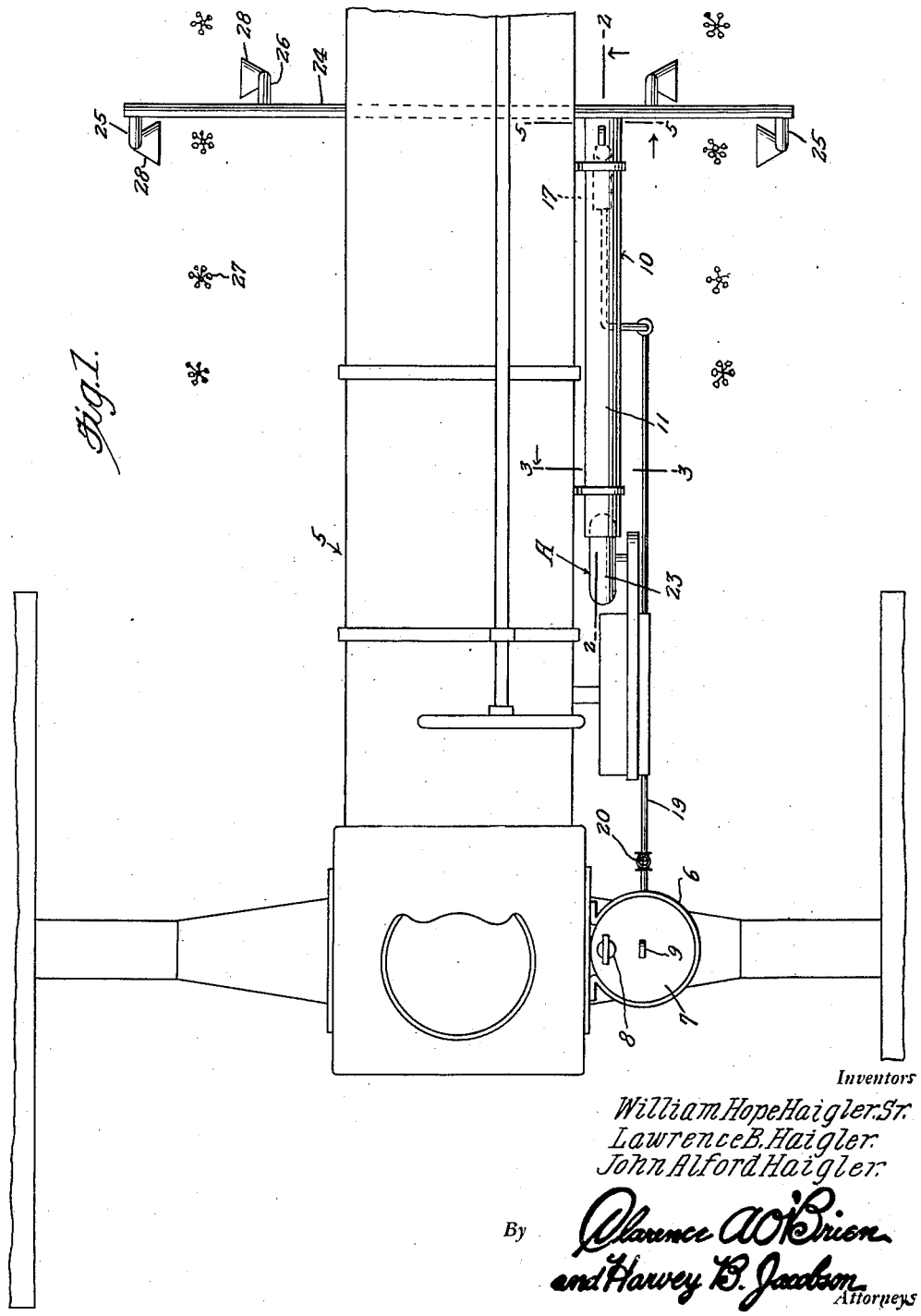
Figure 1 represents a top plan view of a tractor showing the invention installed thereon.
Figure 5:
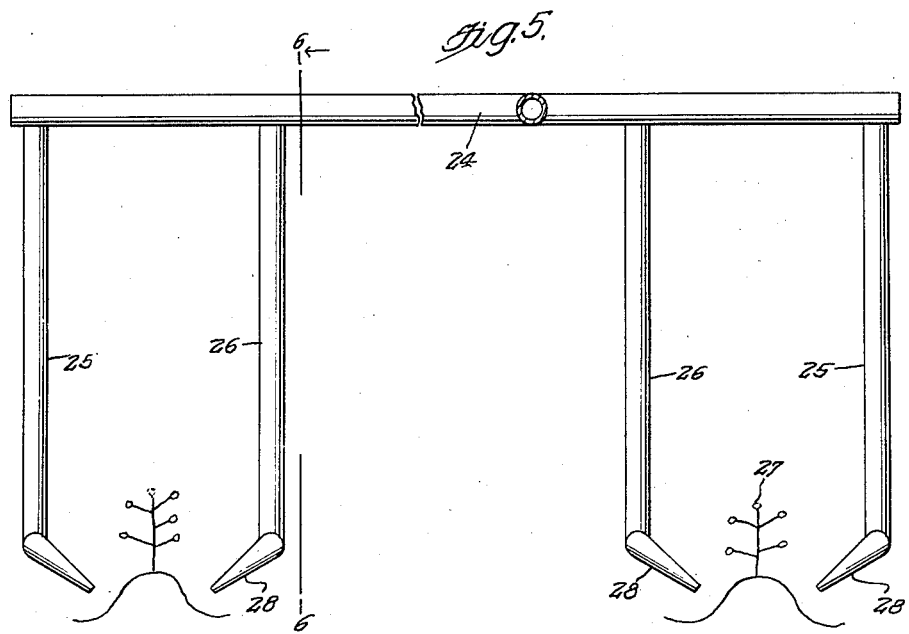
Figure 5 is a sectional view taken substantially on the line 5—5 of Figure 1.

Referring to the drawings wherein like numerals designate like parts, it can be seen that numeral 5 generally refers to a tractor or some other suitable farm implement, preferably power driven.

On this tractor 5 is mounted by a clamp band or bands 6, a fuel tank 7 having a pressure building pump 8 installed therein. This tank may be provided with a pressure gauge 9.

Numeral 10 generally refers to the heating apparatus of the present invention and this embodies an elongated housing 11 of some suitable heat refractory substance which encases a shell 12 having headers 13, 14 at the ends thereof, between which tubes 15 extend. This defines a heating chamber 16 through which hot gases resulting from combustion travel from an elbow-shaped combustion chamber 17, it being observed in Figure 2, that a burner nozzle 18 extends into this combustion chamber 17 and has connected thereto a pipe line 19 from the fuel tank 7. This pipe line 19 has a control valve 20 therein. It will be understood that the combustion chamber 17 is constructed and arranged to admit air into the same, for instance, through openings 17'.

Figure 6:
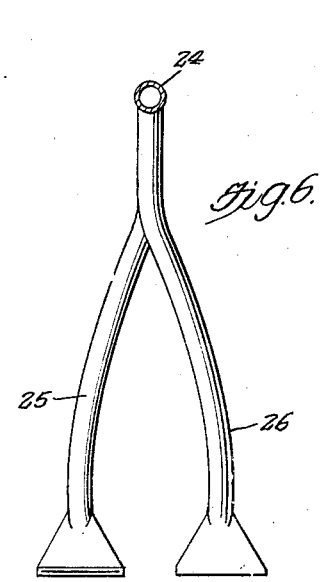
Figure 6 is a sectional view taken substantially on the line 6—6 of Figure 5.
Figure 7:
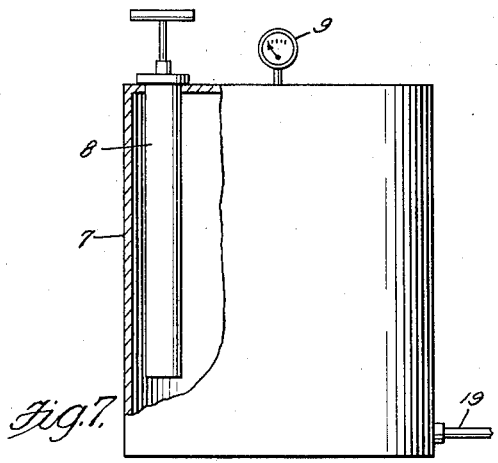
Figure 7 is a fragmentary side elevational view of the fuel tank.

A generally refers to a blower comprising a casing 21 having a fan 22 therein and numeral 23 denotes a gooseneck outlet for the casing 21 which extends into one end of the housing 11 to what constitutes the air intake ends of the tubes 15. The combustion chamber 17 is preferably at the forward end of the shell 12 while at the other, or rear, end is an exhaust pipe 29 which preferably connects to the output side 5 of the fan casing 21 which is provided in its opposite side with an air inlet 21'. In other words, heated air and hot gases are drawn into the casing 21 by the fan 22 from the heating chamber 16 and forced through the gooseneck 23 and tubes 15, where the air and gases are further heated before passing into a space 23' and from there to a manifold pipe 24 from which depends tubular legs 25, 26 at each end portion thereof. Each pair of tubular legs 25, 26 take care of one row 27 of crops as is shown in Figure 1, and also in Figure 6, the legs 25, 26 are offset, so that nozzles 28 provided at the lower ends thereof will be in offset relation to the end that hot gases emanating therefrom will not strike and cause an updraft or upsweeping of the hot gases into the foliage of the growing plants.

Obviously, the flame in the combustion chamber 17 can be controlled to the extent desired with the result that the temperature of the discharged hot air and gases is uniformly the same, and to the degree desired.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A weed destroyer for attachment to a tractor alongside the same comprising a heater including a cylindrical shell adapted to be disposed horizontally lengthwise alongside the tractor, a pair of headers in said shell adjacent opposite ends thereof, forming therebetween a heating chamber, one of the headers forming with one end of the shell a gas discharge chamber, tubular heating flues extending through said heating chamber longitudinally thereof and through said headers, a blower unit at the other end of said shell including a gooseneck discharge connection between the same and the other end of the shell and discharging into said flues, means to introduce heated air and gases resulting from combustion into said heating chamber comprising a burner and a tubular combustion chamber communicating with the end of the heating chamber nearest the first-mentioned end of the shell, a discharge pipe leading from the other end of said heating chamber to said blower, and gas outlet means for said discharge chamber including nozzles.

WILLIAM HOPE HAIGLER, Sr.
LAWRENCE B. HAIGLER.
JOHN ALFORD HAIGLER.